(12) United States Patent
Lazich et al.

(10) Patent No.: US 6,298,514 B1
(45) Date of Patent: Oct. 9, 2001

(54) CLEANING TOOL FOR ELECTRONIC AND COMPUTER EQUIPMENT

(76) Inventors: Matthew H. Lazich, 673 Washington Blvd., Marina Del Rey, CA (US) 90292; Rodolfo Gastelum, 1450 Brett Pl. #111, San Pedro, CA (US) 90732; Sean Lee, 14731 Condon Ave., Lawndale, CA (US) 90260

( * ) Notice: Subject to any disclaimer, the term of this patent is extended or adjusted under 35 U.S.C. 154(b) by 0 days.

(21) Appl. No.: 09/327,444

(22) Filed: Jun. 5, 1999

(51) Int. Cl.[7] ........................................ A47L 25/00
(52) U.S. Cl. .................... 15/106; 15/104.001; 15/118; 15/211
(58) Field of Search ............... 15/104.001, 104.002, 15/104.005, 104.16, 105, 106, 114, 118, 160, 210.1, 211; D14/114

(56) References Cited

U.S. PATENT DOCUMENTS

| | | | |
|---|---|---|---|
| 4,417,370 | * 11/1983 | Lewis | 15/104.002 |
| 4,760,618 | * 8/1988 | Chapin | 15/104.001 |
| 5,519,910 | * 5/1996 | Messina | 15/104.001 |
| 5,970,559 | * 10/1999 | Christy | 15/106 |
| 5,985,042 | * 11/1999 | Fiedler | 15/104.001 |

FOREIGN PATENT DOCUMENTS

2268049 * 1/1994 (GB) ................... 15/104.001

* cited by examiner

*Primary Examiner*—Terrence R. Till
(74) *Attorney, Agent, or Firm*—Robert N. Schlesinger

(57) ABSTRACT

This Cleaning Tool for Electronic and Computer Equipment relates to a stick-like device with hook and loop fastener means on one or more of said device's two terminal ends. The Cleaning Tool may be used for removing grease, grime, lint, dust, dirt and the like from electronic and computer equipment. The Cleaning Tool has particular utility as a cleaner of electromechanical mouse devices.

8 Claims, 22 Drawing Sheets

CLEANING TOOL FOR ELECTRONIC AND COMPUTER EQUIPMENT

BACKGROUND

Field of the Invention

This invention, entitled "Cleaning Tool for Electronic and Computer Equipment", was devised and invented by Matthew H. Lazich, Rodolfo Castelum, and Sean S. Lee, and relates to a device which may be used for cleaning electronic and computer equipment, such as a computer keyboard, laptop computers, control panel or console, computer mouse, computer vents and disk drive openings, stereo equipment, cameras automobile dashboards, and he like. Said invention is particularly useful in cleaning lint, particulate matter such as dust, and grime, i.e., a combination of grease or oil with dust or the like, from between the keys of a keyboard, and between the buttons and crevices of a console or control panel.

This "Clearing Tool for Electronic and Computer Equipment", will hereinafter be referred to as the "Cleaning Tool", and as a proper noun, with the first letter of each word capitalized, throughout this specification and its appended claims.

DESCRIPTION OF THE PRIOR ART AND THE NEED FOR THE PRESENT INVENTION

Electrical and computer equipment, and particularly the control panels and consoles, are exposed to the office or home environment, and in time, accumulate dust, lint, grime, food particles, and other particulate matter in the cracks and parting lines around the buttons, and the like. If this particulate matter is not removed, the equipment becomes unsightly and unpleasant to use, and may be subject to failure, due to electrical or electromechanical shorts of physical obstructions. Heretofore, the means for removing such particulate matter is with a wet rag, cloth, or cotton swab, or with compressed air or a vacuum cleaner. These means are ineffective, and pose a risk to the equipment, where, e.g., water ray damage the circuitry. Furthermore, blown air from a compressed air canister is likely to push the particulate matter further into the equipment, thereby increasing the risk of potential failure.

The inventors, Matthew H. Lazich, Rodolfo Gastelum, and Sean S. Lee, have devised and invented a device to clean lint, grime, and particulate matter, from between the keys of a keyboard, from between the buttons on a control panel or console, and from the parting lines and crevices in electronic and computer equipment, such as a computer mouse.

A primary application for the present invention is to clean the aforementioned electronic and computer equipment with ease and to safely remove said particulate matter such as lint, dust, grime, and the like, from said equipment. Failure to periodically remove such particulate matter from said equipment, may cause the malfunction or failure of the equipment. Using other means to attempt to remove particulate matter, such as the use of a wet rag or cotton swap, or an air pressure device, such as a air spray canister, or a vacuum cleaner, ray incur damage to sensitive electronic and computer equipment, and these means are often ineffective. Furthermore, it is inconvenient and more time consuming to use a vacuum cleaner or a wet rag to attempt to clean said equipment.

DESCRIPTION OF FURTHER ADVANTAGES AND OBJECTIVES OF THE PRESENT INVENTION

In trying to solve the above-described electronics and computer equipment problems and disadvantages and within the scope of this objective, it was surprising to find that a solution to the above described problems and disadvantages need not be expensive or involve complex technology.

The objectives and advantages of a simple embodiment of the present Cleaning Tool invention include:

1. The Cleaning Tool invention is inexpensive to tool and manufacture.
2. The Cleaning Tool invention is small and easy to store and transport.
3. The simple and preferred embodiments of the Cleaning Tool invention has two cleaning elements, with one located at each -end of said Cleaning Tool, as shown in the drawing Figures.
4. The Cleaning Tool invention has a cleaning element which is designed for cleaning between keys, buttons, parting lines, or crevices, and is thin and may be, for example, fan or fish-tail shaped, is shown in FIGS. 2 and 3.
5. The Cleaning Tool invention also, has a cleaning element which is designed for cleaning a computer mouse (once the sphere is removed from the mouse), and other concave surfaces, and this cleaning element is shaped like a banded quasi-sphere or a portion thereof, such as a band around a quasi-sphere or the like as shown in FIGS 1–20. Said band may be a portion of a band; such as a band extending 85 percent about the quasi-sphere, with a 15 percent gap. The banded quasi-sphere may be a flattened sphere, a frusto-sphere, a disc shape, an ellipsoidal shape, a cylinder, cone, frusto-conical section, or a combination thereof. This cleaning element has particular utility in cleaning not only the orifice of a mouse with the sphere removed, but also the bearings, torus and sphere shaped sensors, and the like, contained within said orifice.
6. The Cleaning Tool invention uses a hook and loop fastening material, such as VELCRO®, or the like, and which is attached to the fan tip (2) and the band channel (6), as the cleaning element or means. The tiny hooks or loops act to attach lint, dust, dirt, and grime thereto, and remove it from the desired area. The lift, dust, dirt, and grime may then be manually removed from said hook and loop cleaning surface of the Cleaning Tool, see FIGS. 21 and 22 for embodiments of the hook surface (7).
7. The Leaning Tool invention may utilize a hook or a loop fastener as the cleaning element. The tiny hooks have a greater adhesive-like effect, and may be preferred in some embodiments, whereas the tiny loops may be preferred in some other embodiments. For most applications, the tiny hooks are preferred on the band quasi-spherical tip (3), and the tiny loops are preferred on the fan tip (2).

Further objects, features, and advantages of the present invention will become more apparent from the following descriptions, when taken with the accompanying drawing figures that show, for purposes of illustration only, embodiment constructions in accordance with the present invention.

DESCRIPTION OF THE DRAWING FIGURES

The drawing figures reflect a preferred embodiment for the present Cleaning Tool invention, and as is intended for use by consumers in cleaning automobile consoles, and electronics and computer keyboards and control panels, but said invention is not limited to said use or application, and may further have applications in other types of consumer situations, as well as in other industries.

Figure 1:
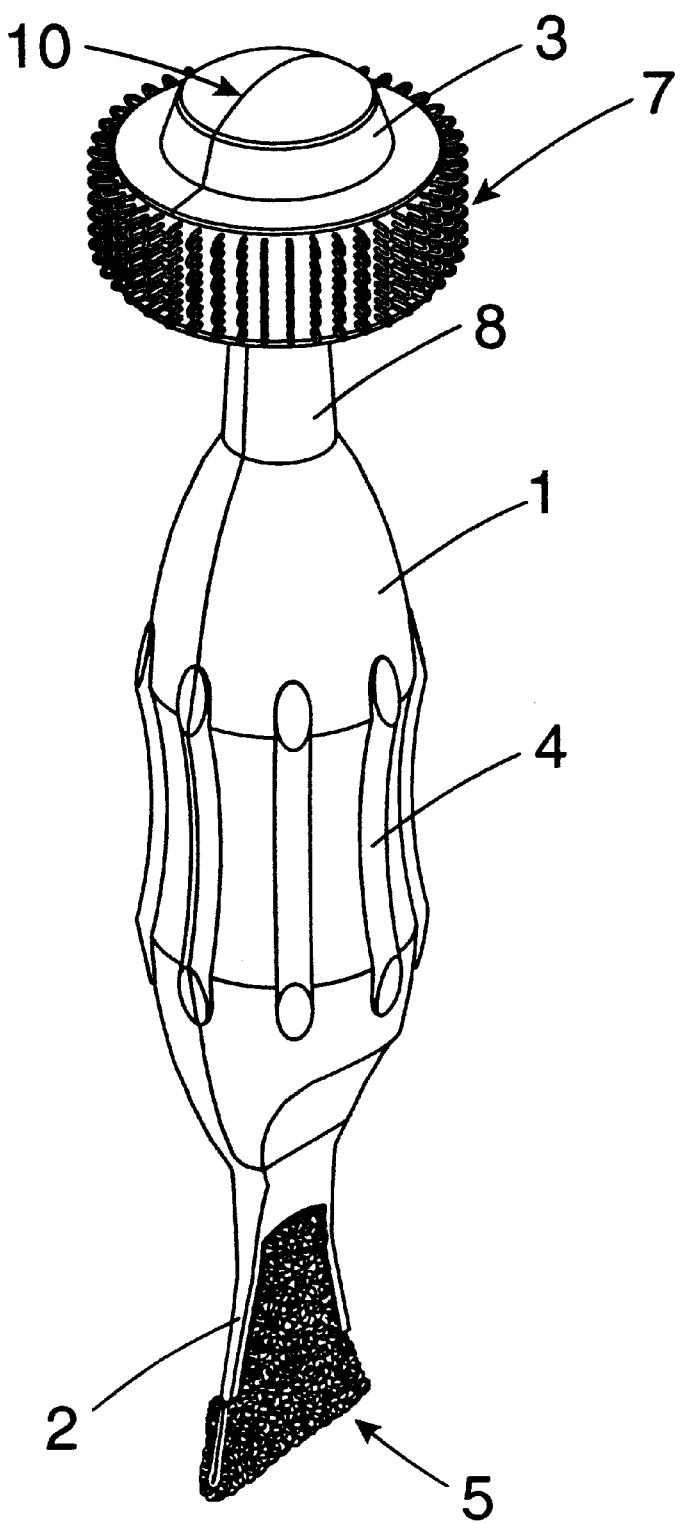
FIG. 1 shows a top isometric side view of a preferred embodiment of the Cleaning Tool.
Figure 2:
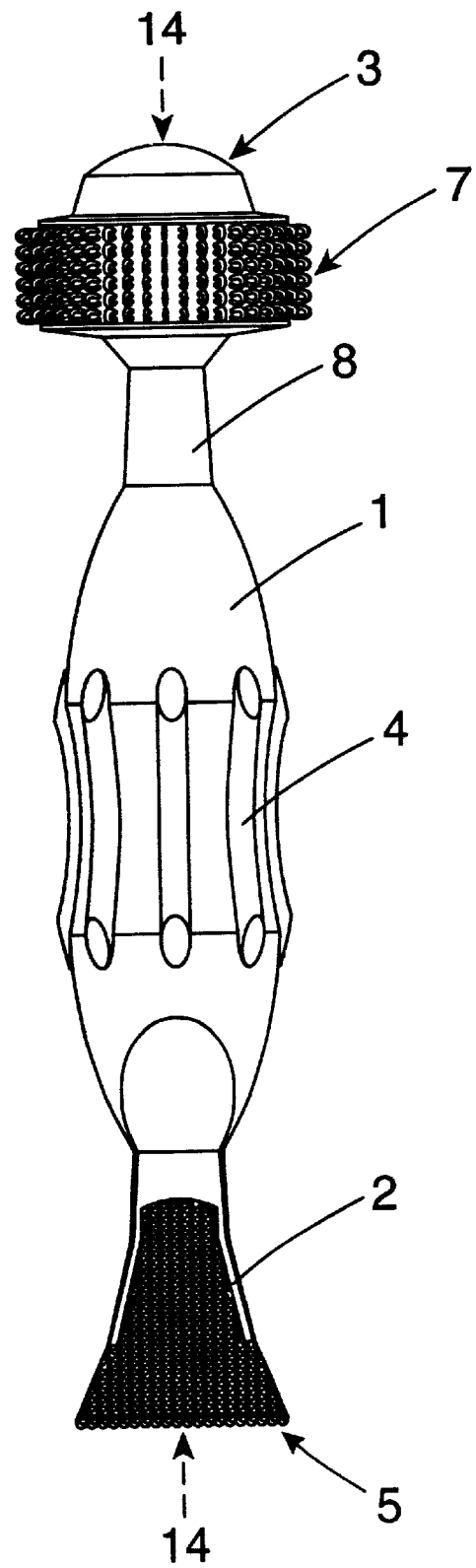
FIG. 2 shows a side view of a preferred embodiment of the Cleaning Tool, the opposite view being a mirror image thereof.
Figure 3:
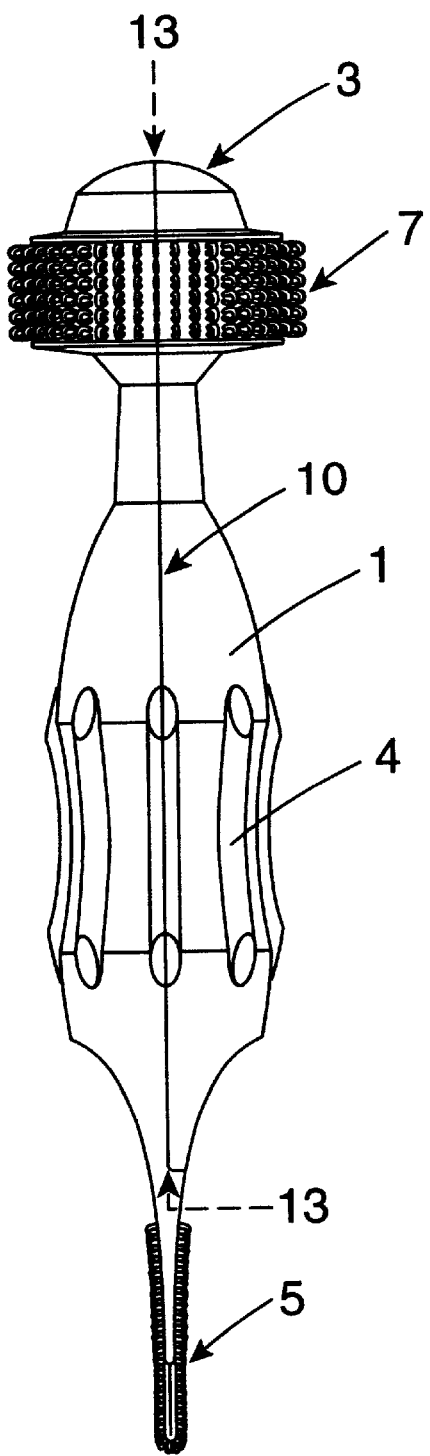
FIG. 3 shows a side view of a preferred embodiment of the Cleaning Tool, as shown in FIG. 2, but rotated 90 degrees in a clockwise direction, about the vertical axis.
Figure 4:
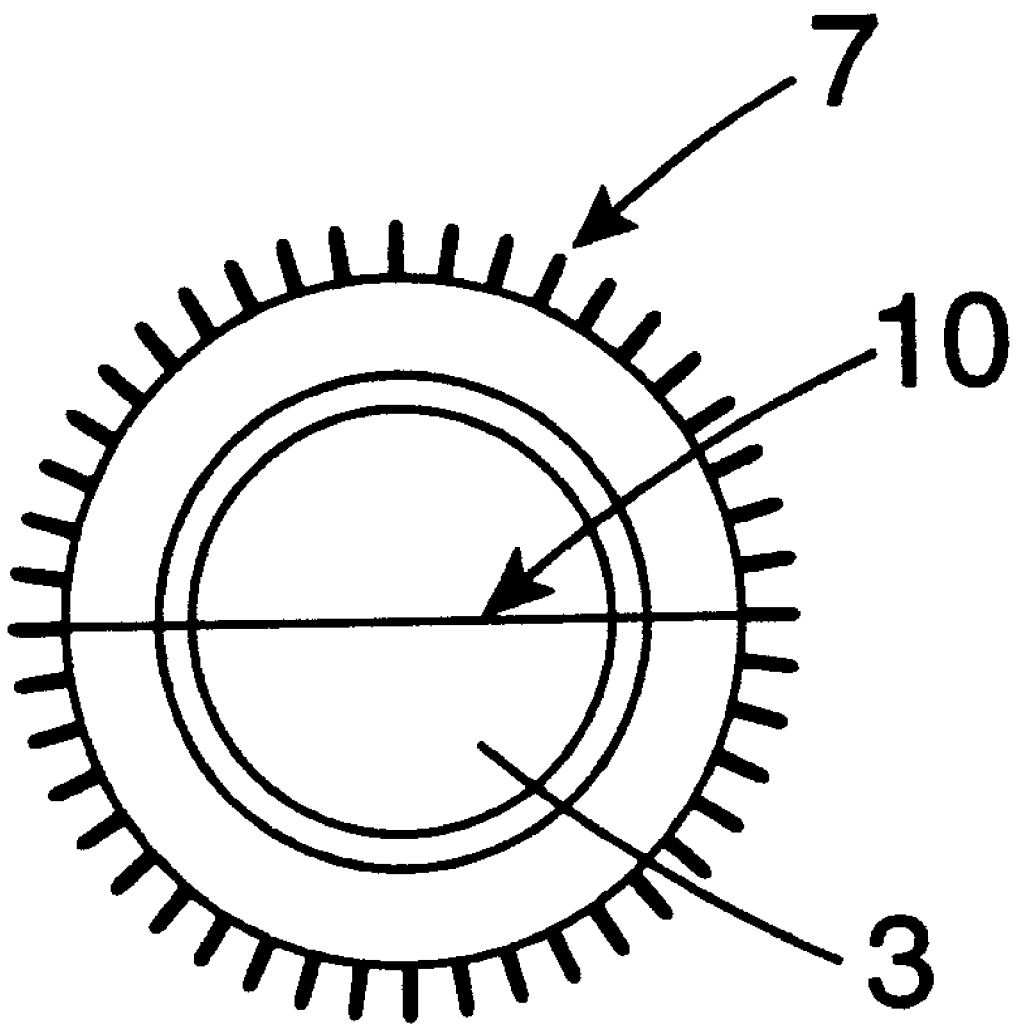
FIG. 4 shows a top view of a preferred embodiment of the Cleaning Tool, the opposite end being the bottom end.
Figure 5:
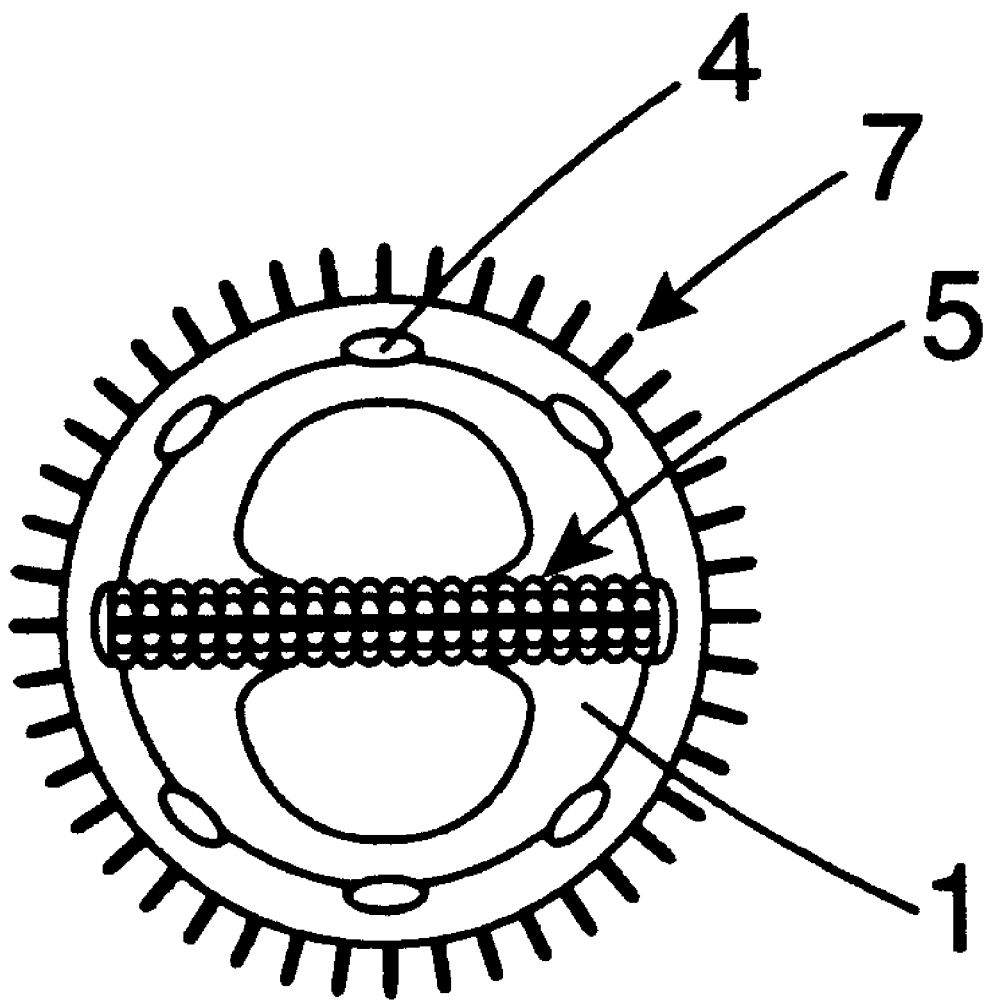
FIG. 5 shows a bottom view of a preferred embodiment of the Cleaning Tool.
Figure 6:
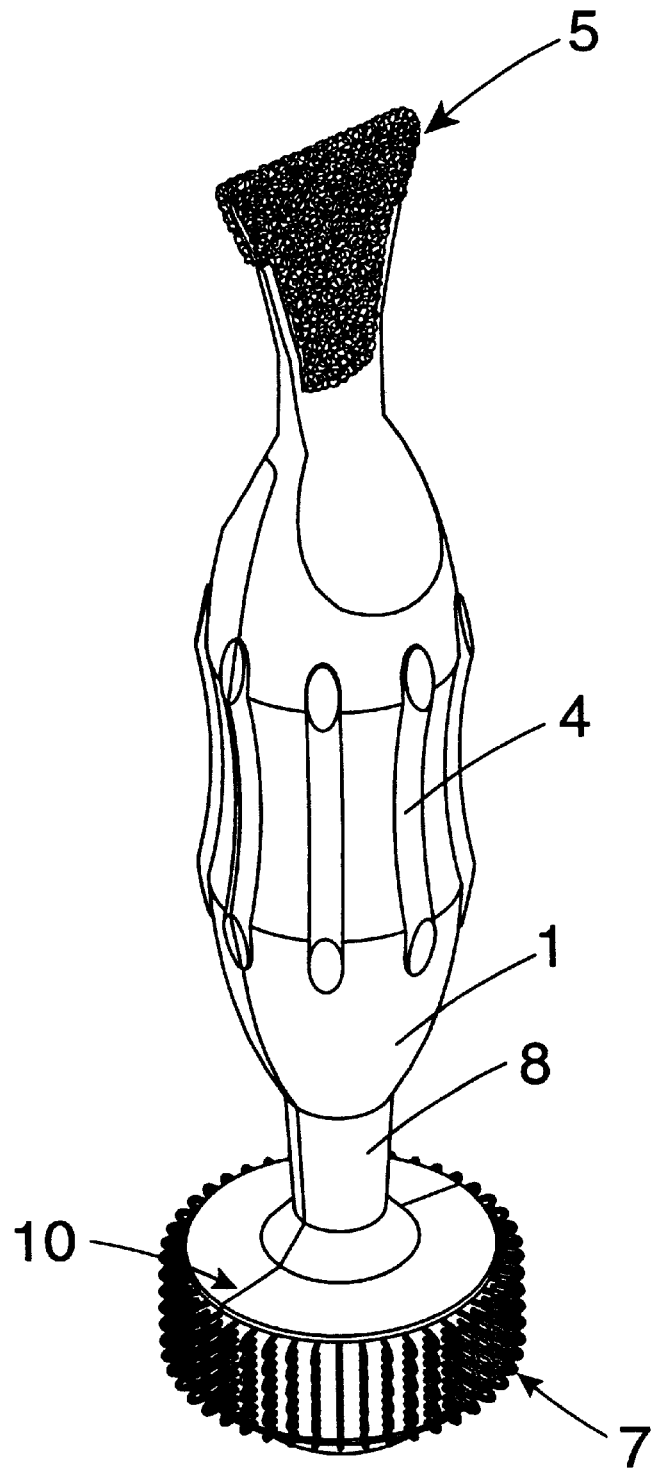
FIG. 6 shows a bottom isometric side view of a preferred embodiment of the Cleaning Tool.
Figure 7:
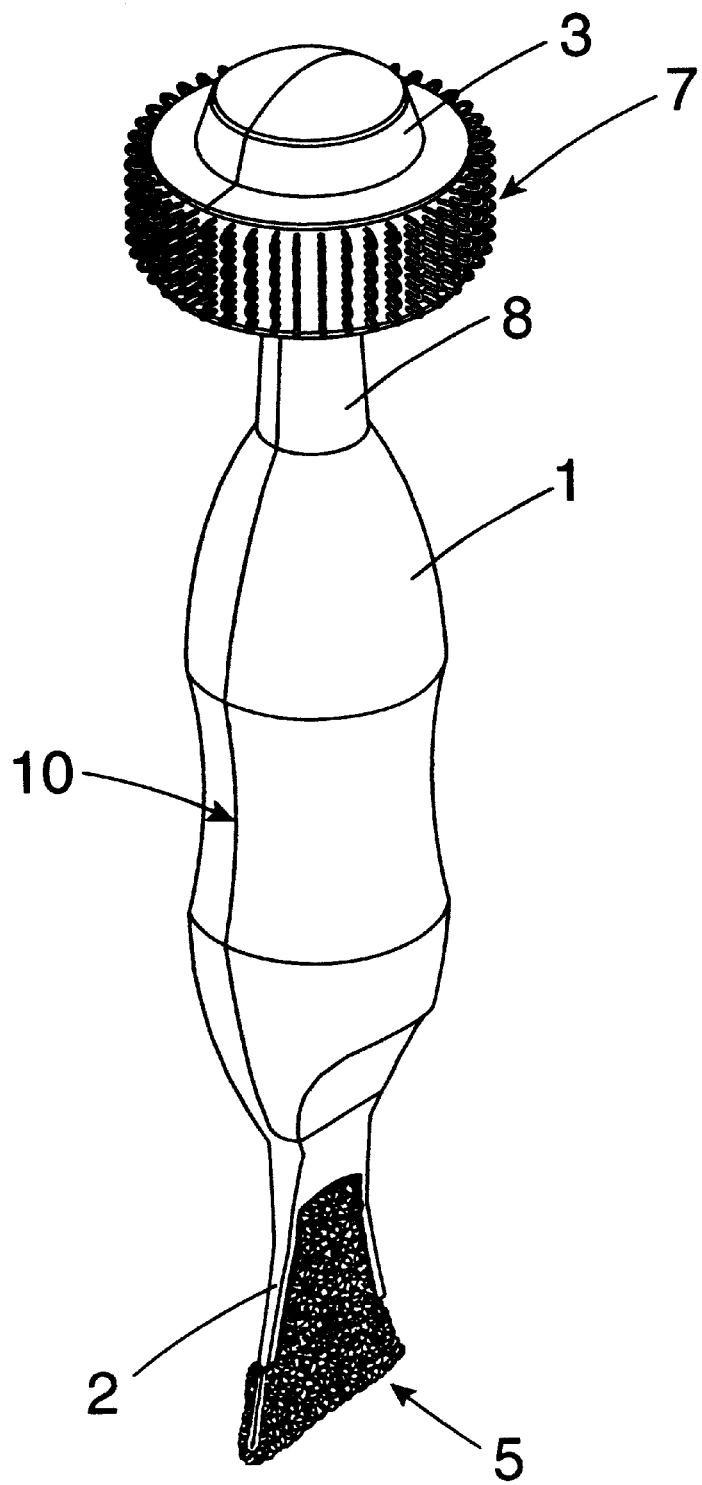
FIG. 7 shows is top isometric view of a modified preferred embodiment of the Cleaning Tool, without grips.
Figure 8:
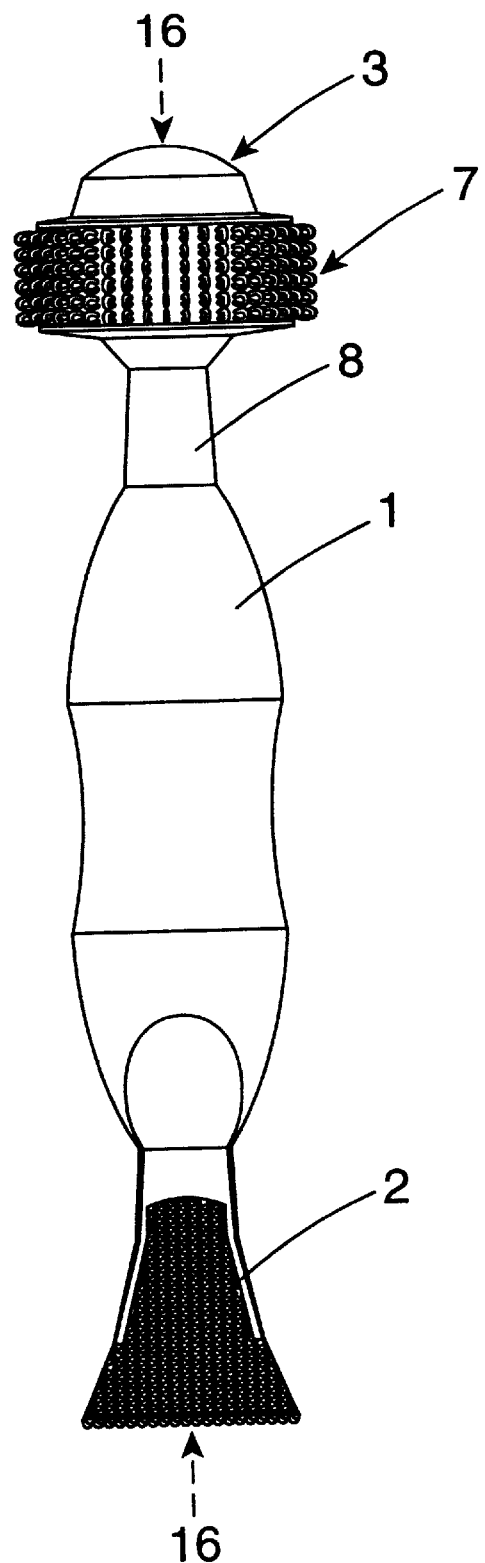
FIG. 8 shows a side view of said modified preferred embodiment of the Cleaning Tool, the opposite view being a mirror image thereof.
Figure 9:
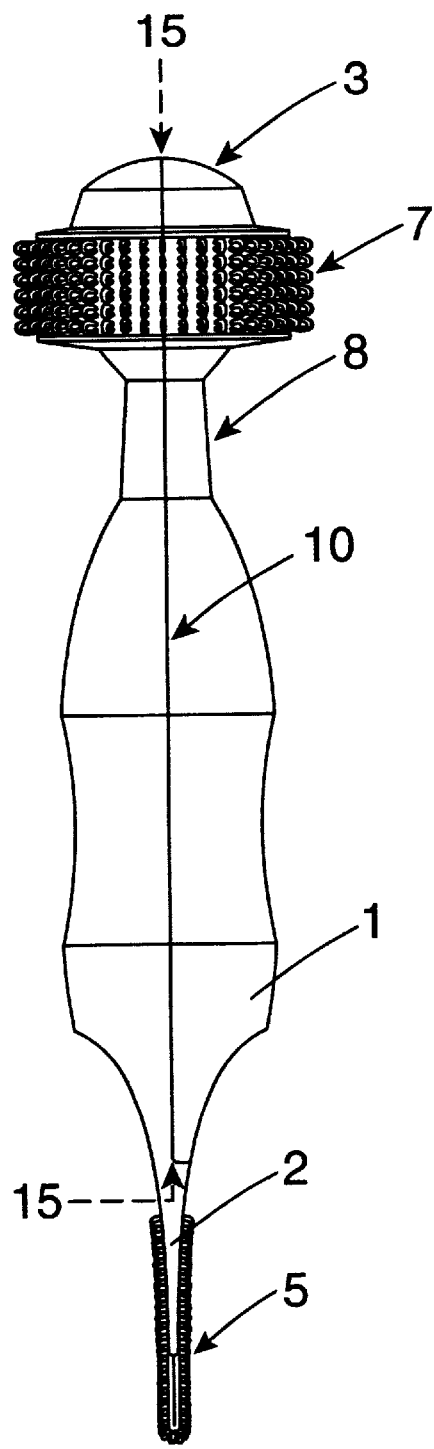
FIG. 9 shows a side view of said modified preferred embodiment of the Cleaning Tool as shown in FIG. 8, but rotated 90 degrees in a clockwise direction, about the vertical axis.
Figure 10:
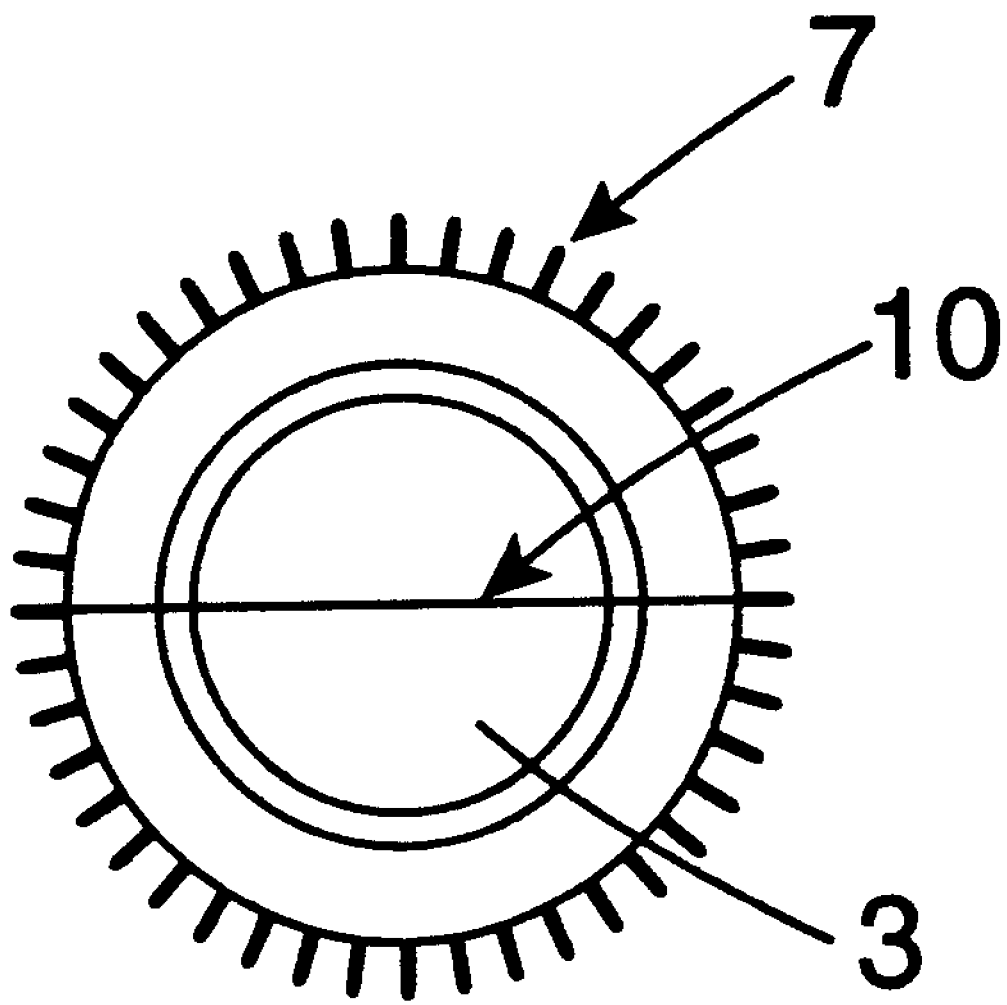
FIG. 10 shows a top view of said modified preferred embodiment of the Cleaning Tool, the opposite end being the bottom end.
Figure 11:
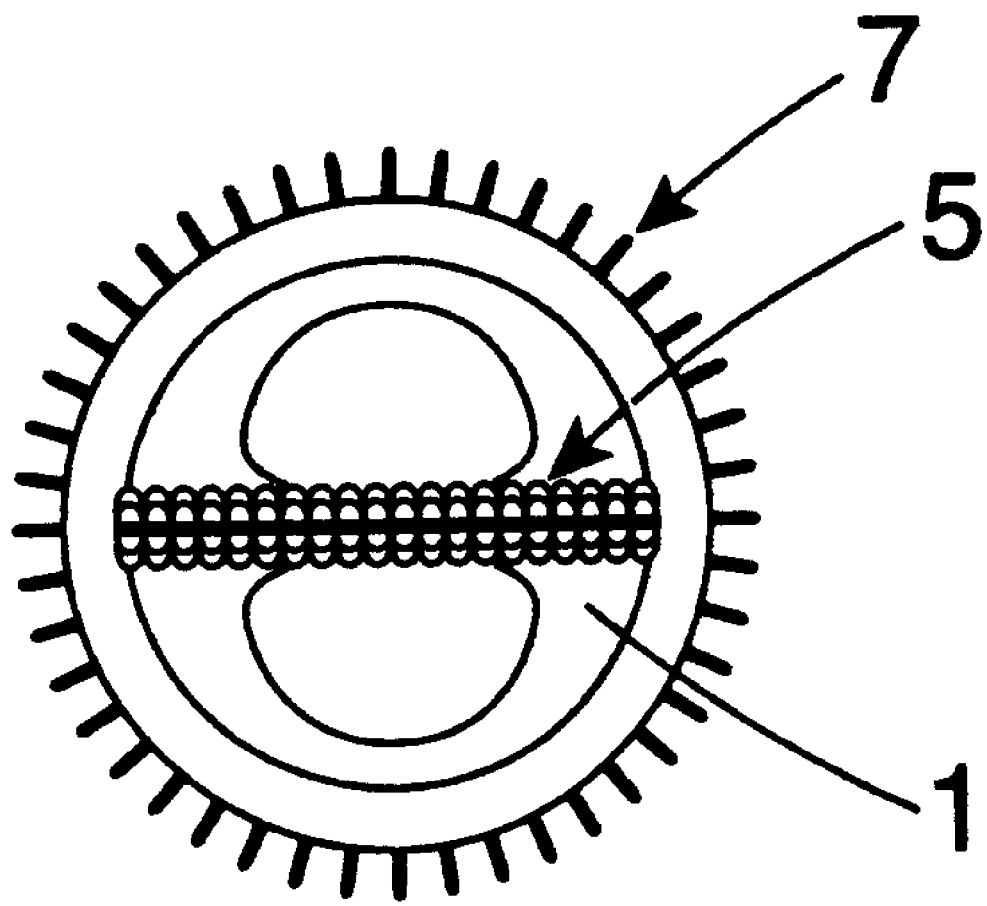
FIG. 11 shows a bottom view of said modified preferred embodiment of the Cleaning Tool.
Figure 12:
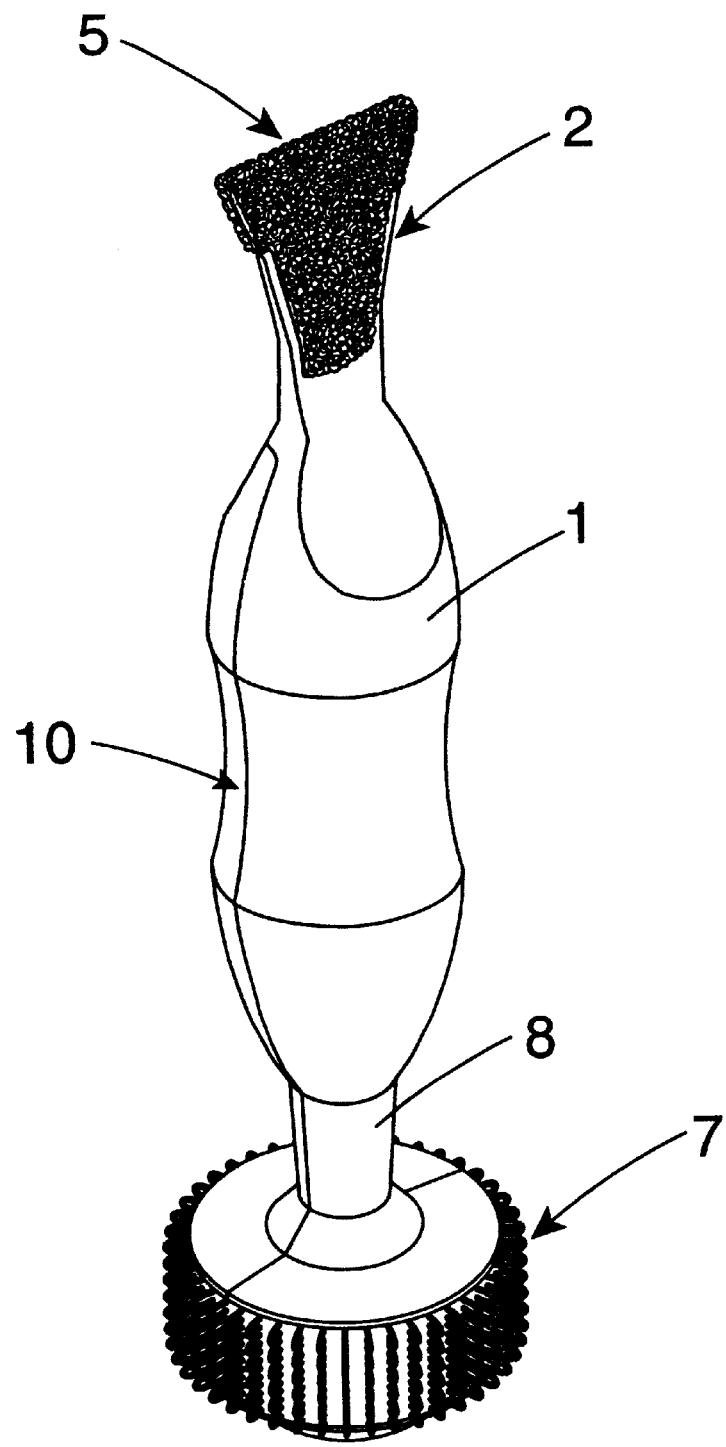
FIG. 12 shows a bottom isometric side view of said modified preferred embodiment of the Cleaning Tool.
Figure 13:
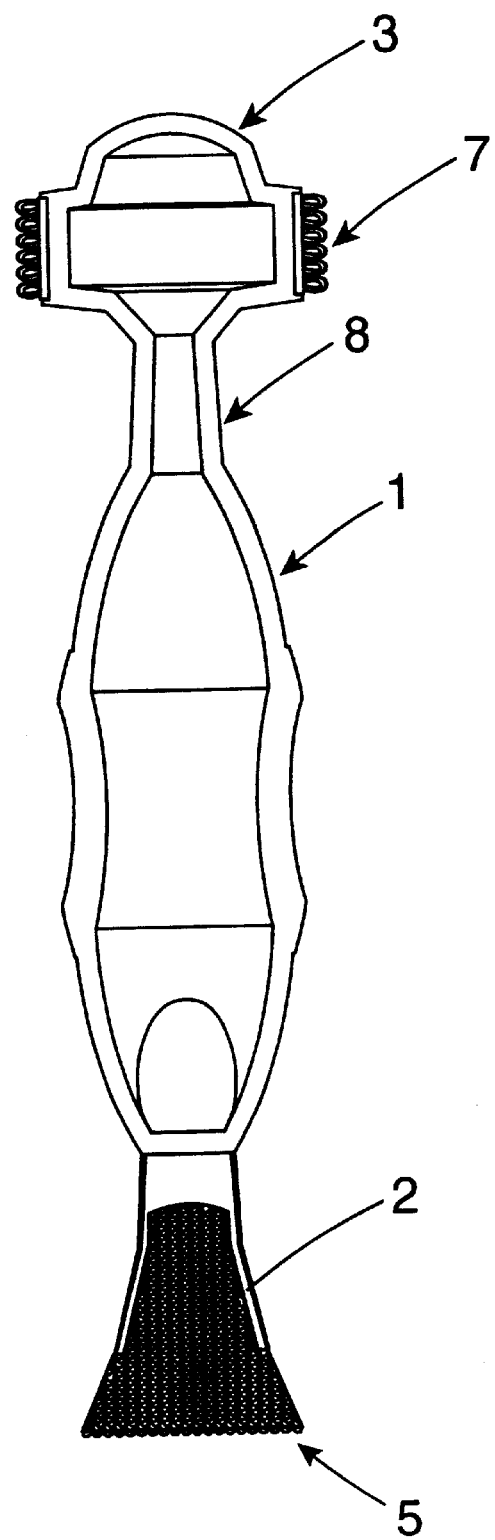
FIG. 13 shows a sectional side view of a preferred embodiment of the Cleaning Tool, the section taken along lines 13—13, shown in FIG. 3.
Figure 14:
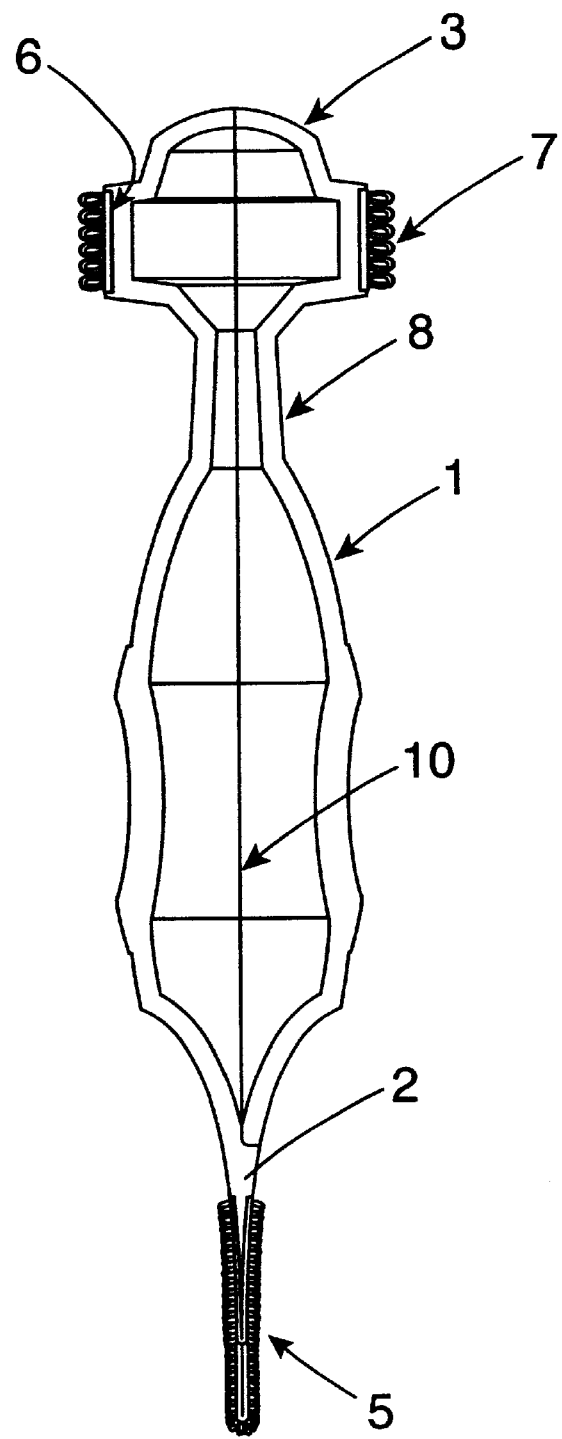
FIG. 14 shows a sectional side view of a preferred embodiment of the Cleaning Tool, the section taken along lines 14—14 shown in FIG. 2.
Figure 15:
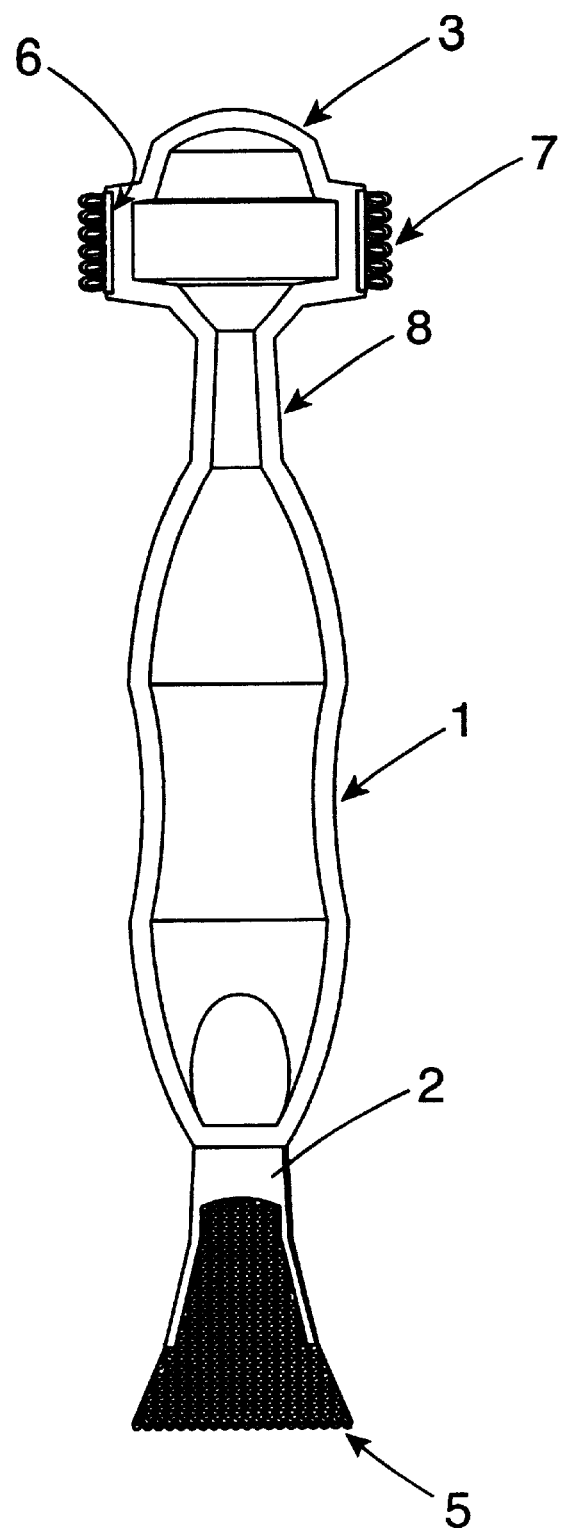
FIG. 15 shows a sectional side view of said modified preferred embodiment of the Cleaning Tool, the section taken along lines 15—15, shown in FIG. 9.
Figure 16:
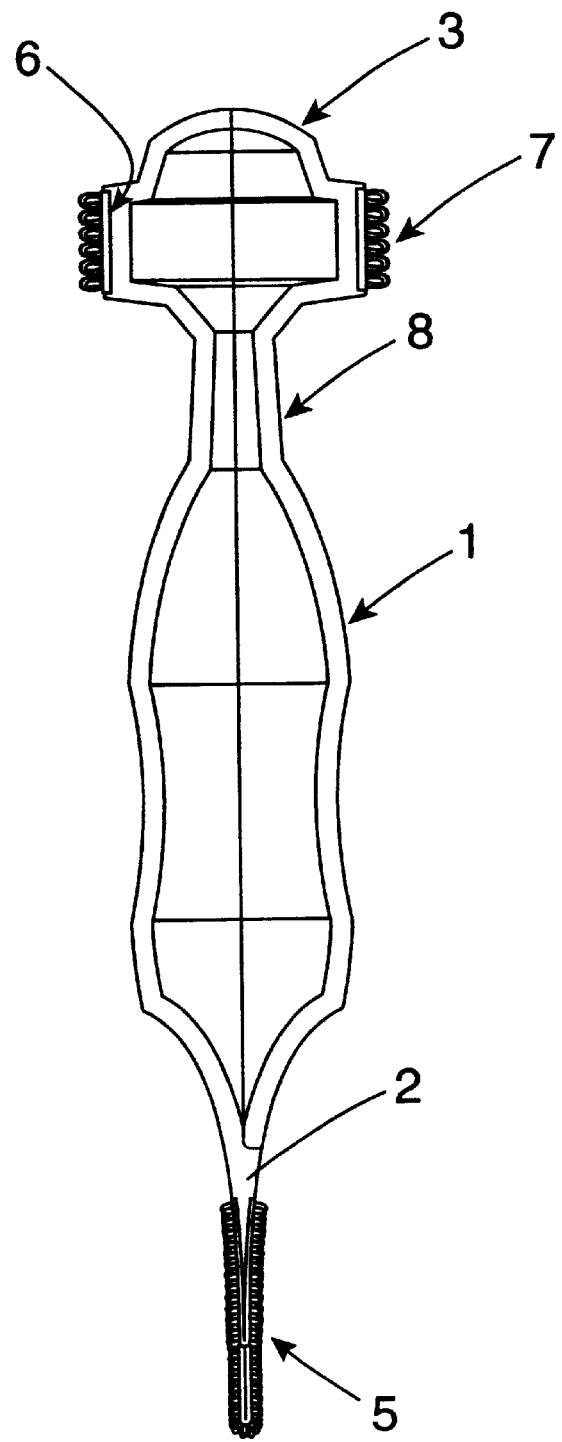
Figure 17:
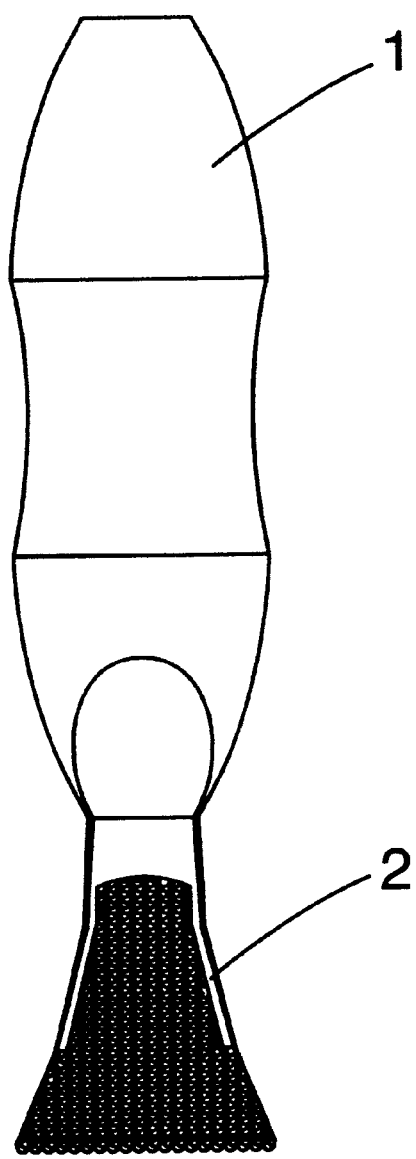

FIG. 16 shows a sectional side view of said modified preferred embodiment of the Cleaning Tool, the section taken along lines 16—16, shown in FIG. 8. FIG. 17 shows a side view of a modified embodiment of the Cleaning Tool, comprised essentially of a substantially pinched tubular body (1) with a fan tip (2) at one end of said substantially pinched tubular body (1), and a fastener surface attached to said-fan tip (2).

Figure 18:
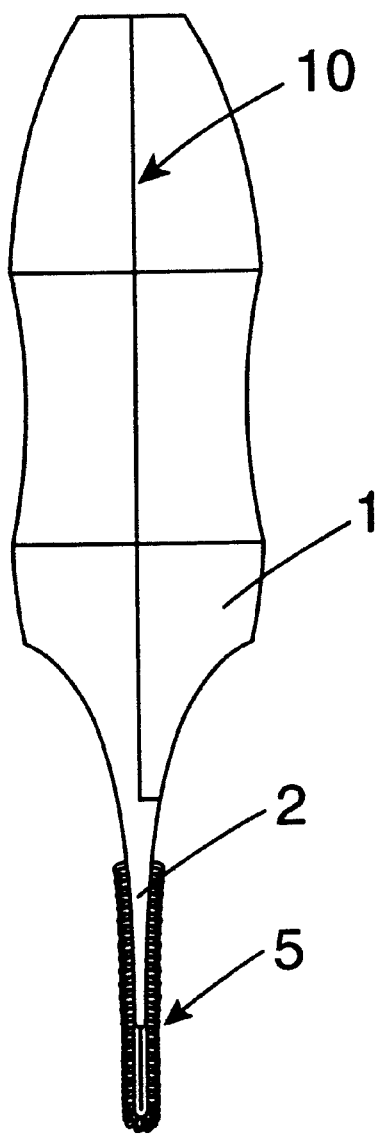

FIG. 18 shows a side view of a modified embodiment of the Cleaning Tool, as shown in FIG. 16, but rotated 90 degrees about the vertical axis.

Figure 19:
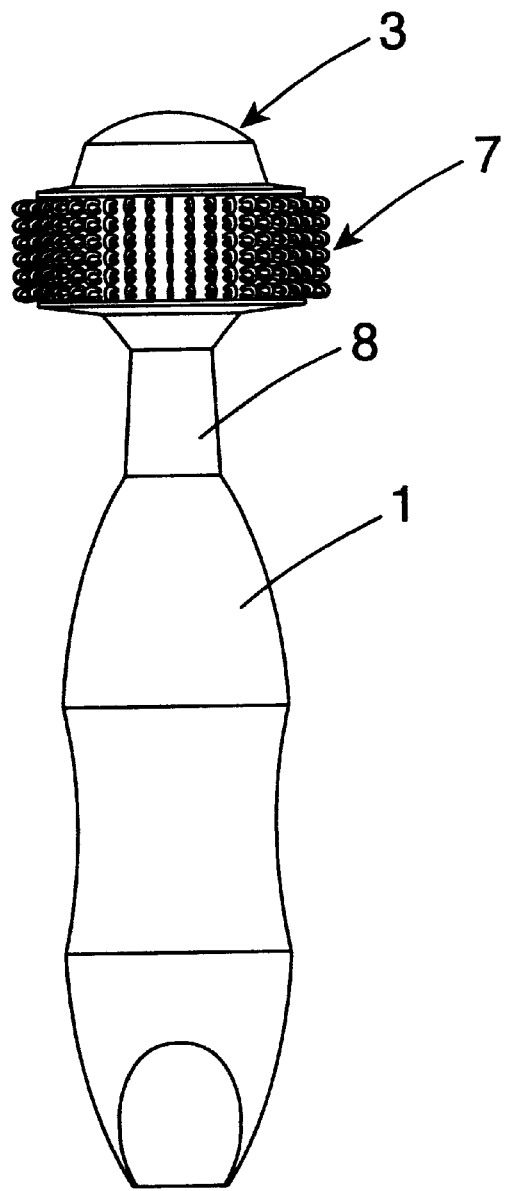

FIG. 19 shows a side view of a modified embodiment of the Cleaning Tool, comprised essentially of a substantially pinched tubular body (1) with a banded, quasi-spherical tip (3) at one end of said substantially pinched tubular body (1), and a fastener surface attached to said banded quasi-spherical tip (3).

Figure 20:
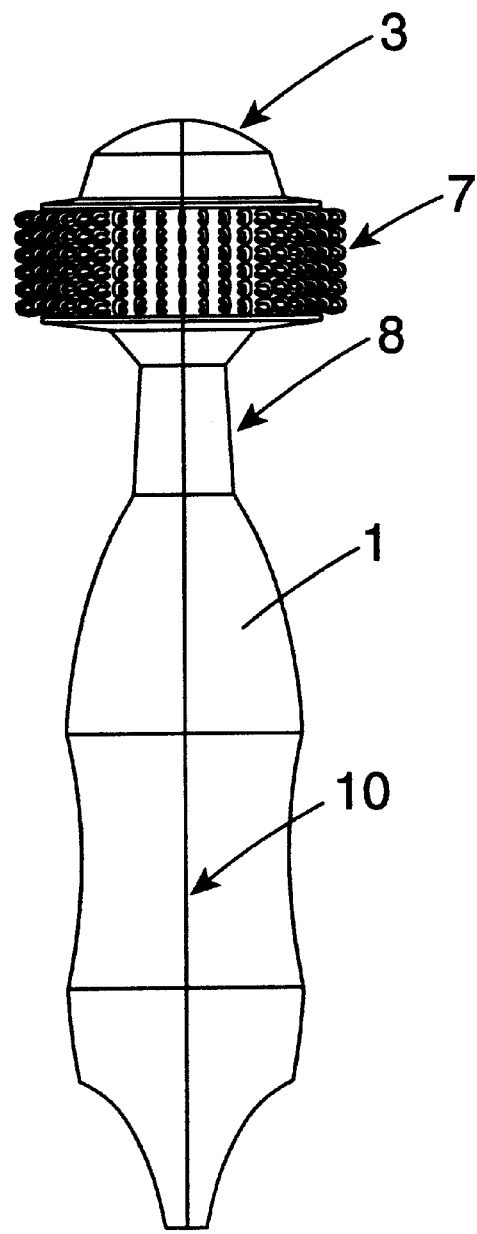

FIG. 20 shows a side view of a modified embodiment of the Cleaning Tool, as shown in FIG. 18, but rotated 90 degrees about the vertical axis.

Figure 21:
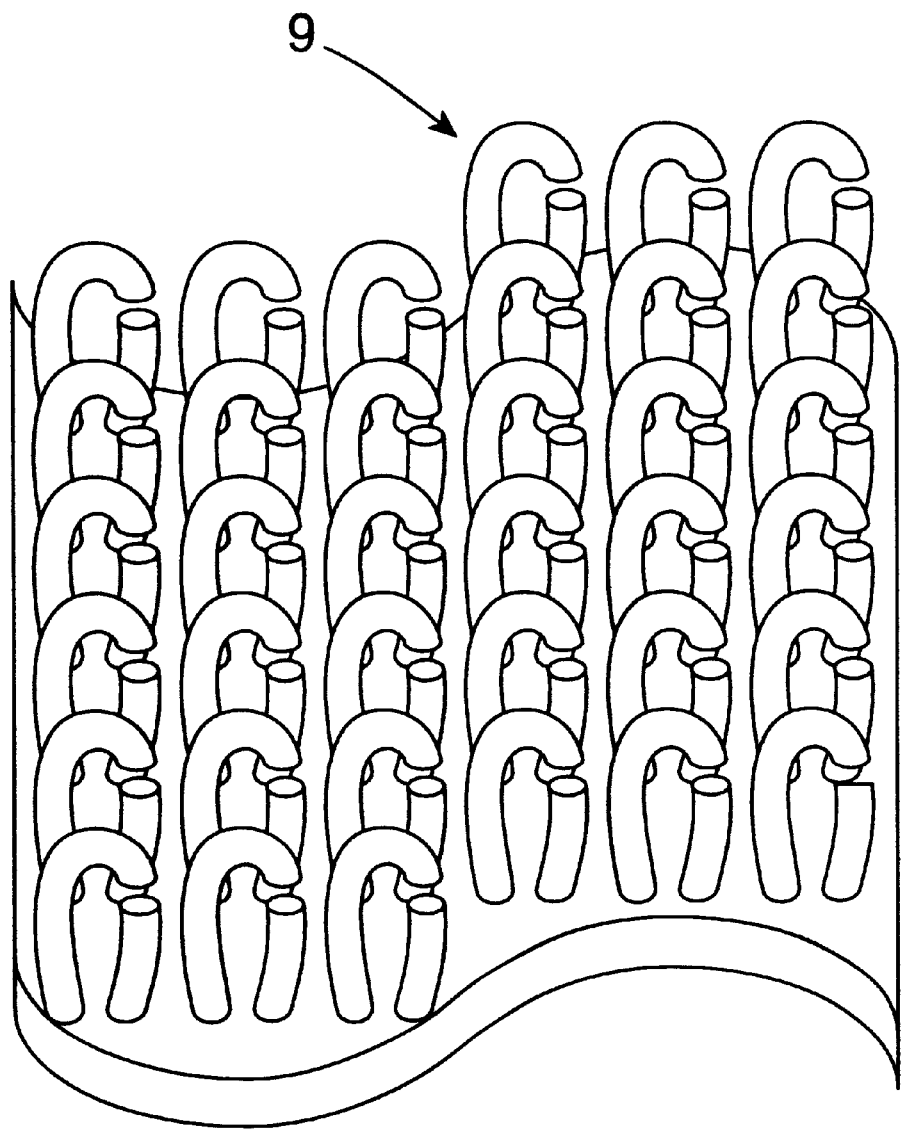

FIG. 21 shows a portion of a fastener surface (9) having an embodiment of a hook surface (7). A loop surface (5) would not have the break in the fastening means protruding from the surface material.

Figure 22:
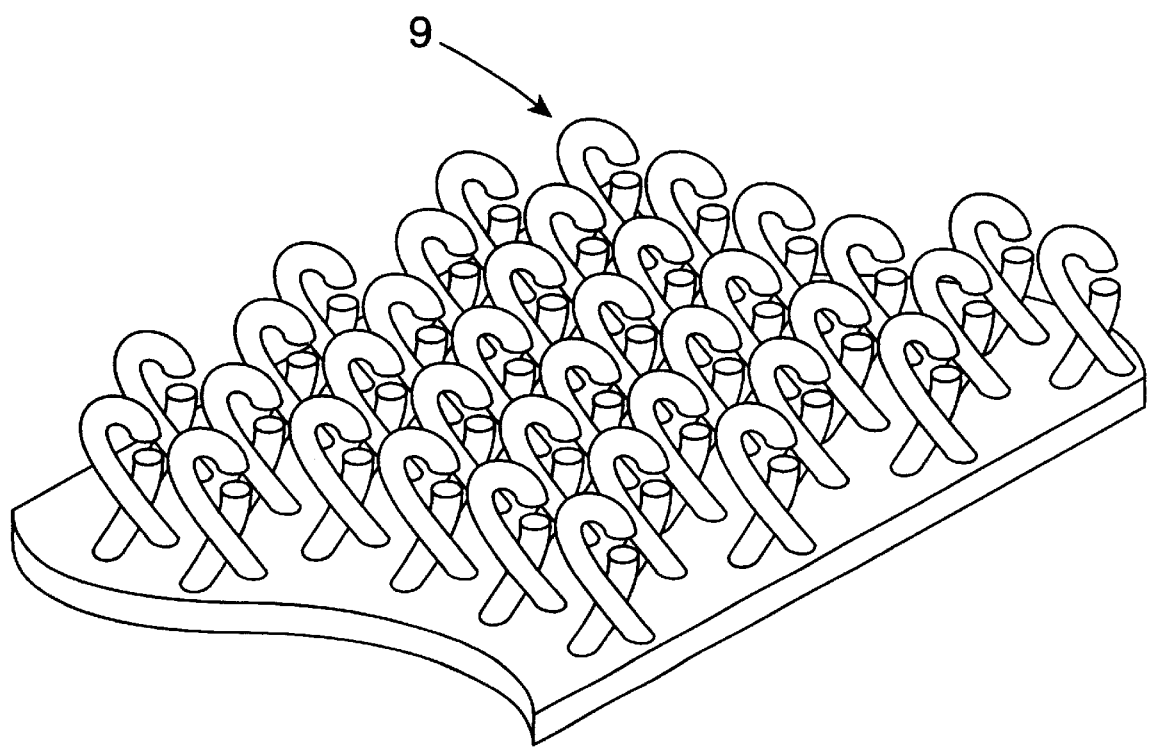

FIG. 22 shown a portion of a fastener surface (9) having an alternative embodiment of A hook surface (7). A loop surface (5) would not have a break in fastening means protruding from the surface.

REFERENCE NUMERALS IN THE DRAWING FIGURES

Referring now to the drawing figures, like reference numerals are used to refer to like specific parts of the various Figures. The reference numerals used to describe the various parts of the Figures, and the specification and its appended claims, follows.

The Substantially Pinched Tubular Body (1), main body of the Cleaning Tool, which has a Substantially Pinched Tubular shape, but may be tapered in regions and have other geometric properties in areas.

The Fan Tip (2), is the fan-shaped or fish tail shaped end of the Cleaning Tool, which may be used for cleaning between keys, buttons, parting lines, and other narrow areas, with a brooming action. The Fan Tip (2), is located at one end of the Substantially Pinched Tubular Body (1). If the Cleaning Tool also has a banded quasi-spherical tip (3), The fan Tip (2) is located on the end of the Substantially Pinched Tubular Body (1) opposite of the quasi-spherical tip (3).

The Banded Quasi-Spherical Tip (3), is the end of the Cleaning Tool, which accommodates a hook surface (7), and may be used to clean a concave area. The Banded Quasi-Spherical Tip (3), is located at one end of the Substantially Pinched Tubular Body (1). If the Cleaning Tool also has a fan tip (2). The Banded Quasi Spherical Tip (3), is located on the end of the Substantially Pinched Tubular Body (1) opposite of the fan tip (2). The term "Banded-Quasi Spherical", as used throughout this specification and its appended claims refers to a shape substantially similar to that shown in FIGS 1–20, and which may be a circularly cylindrical banded area, capped with a Frusto-Conical region, which is capped with a cap of a sphere, as shown in FIGS 1–20.

The Body Grips (4), is the one or more grips or the like, which are located on the Substantially Pinched. Tubular body (1), and assists the user in holding the Cleaning Tool. The Grips (4) are typically comprised of vertical ribs or the like along the Substantially Pinched Tubular body (1). Said grips may assist the user in gripping or holding the Cleaning Tool.

The Loop Surface (5) is the loop fastening means which is generally attached to the fan tip (2).

The Band Channel (6), is the channel ridge, or the like, and is located on the surface of the banded quasi-spherical tip (3), said channel (6) is for accommodating the hook surface (7). In the preferred embodiment of the Cleaning Tool, or a loop surface in some modified embodiments.

The Hook Surface, (7) is the hook fastening means which is generally attached to the hook band channel (6).

The Neck (8), is the interface between the substantially pinched tubular body (1), and the banded quasi-spherical tip (3), and is narrower than said body (1) or the spherical tip (3).

The Fastener Surface (9) is the hook or loop surface of a hook and loop fastening system, such as VELCRO®. The term "fastener surface" as used throughout this specification and its appended claim, is intended to refer to a hook surface or a loop surface; the term is intended to be more generalized than the terms "hook fastener surface" or the term "loop fastener surface".

The Parting Line (10), is the line or perimeter, running along the longitudinal length of the substantially pinched tubular body (1), which separates the two halves of the injected plastic molded embodiment of the Cleaning Tool. The two halves are fitted together and thereby assembled with a glue fitting, sono-welding, or another means of attaching the two sides together. Another means of fitting and attaching the two halves together is by mechanical means using, e.g., pins and matedly aligned holes.

DESCRIPTION OF A SIMPLE EMBODIMENT OF THE CLEANING TOOL

A simple embodiment of the Cleaning Tool is comprised essentially of a substantially pinched tubular body (1) with a fan tip (2) located at one end of said substantially pinched tubular body (1), and a banded quasi-spherical tip (3) located at the end of the substantially pinched tubular body (1) opposite the fan tip (2). A fastener surface (9) is attached to the surface of said fan tip (2) and the fastener surface (9) is attached to the banded portion of the said banded quasi-spherical tip (3). Essentially the simple embodiment of the Cleaning Tool has a banded quasi-spherical shaped cleaning means located on one end, and a fan shaped cleaning means located on the other end of a substantially pinched tubular body (1) and this cleaning means, is the fastener surface (9). Each fastener surface (9) may utilize either a hook surface (7) or a loop surface 5),

DESCRIPTION OF PREFERRED EMBODIMENT OF THE CLEANING TOOL

The preferred embodiment of the Cleaning Tool is comprised essentially of the elements comprising the simple embodiment, disclosed above, and said preferred embodiment is further comprised essentially of a plurality of grips (4) parallel to and along the substantially pinched tubular body (1) The preferred embodiment is also further comprised of a banded quasi-spherical tip with a band channel (6) thereon, for receiving the hook surface (7) onto the surface of the banded quasi-spherical tip (3). A preferred embodiment is also further comprised of a neck (8) region between the banded quasi-spherical tip (3) and the substantially pinched, tubular body (1). This neck (8) allows for a more complete access and rotation of the banded quasi-spherical tip (3) and its associated hook surface (7) when it is used in cleaning a concave surface, such as the inside of a computer mouse.

The preferred embodiment of the Cleaning Tool is composed essentially of a polymeric or elastomeric material such as acrylonitrile-butaliene-styrene ("ABS") or polypropylene, with the hook fasteners attached to the band channel (6) area, and with the loop fasteners attached to the, fan tip (2) area, as shown in The drawing figures.

The means for attaching the loop fastener surface to the fan tip (2) is with an adhesive means, such as a glue, cyanoacrylate, contact cement, or the like. Said adhesive means may in some embodiments, also be used to attach the hook fastener surface to the band channel (6). A preferred means for attaching the hook fastener surface to the band channel (6) is by tucking a portion of the two ends of said hook surface (7) into an interface between the two halves of the Cleaning Tool, thereby trapping the two ends tightly inside the Cleaning Tool, when said interface or parting line (10) is fixed together by gluing, son-welding, or other means, along the parting line (10).

It should be stated that throughout this specification and its appended claims, the term "hook and loop fastener" is intended to mean a material or surface containing a hook and loop fastening system, such as VELCRO®, or a material or surface containing only the hook fasteners, or only the loop fasteners. The term hook is also intended to refer to multi-hook systems, or the like, and the term loop is also intended to refer to multi-loop or link systems, or the like,

DESCRIPTION OF SOME MODIFIED EMBODIMENTS OF THE CLEANING TOOL

In some modified embodiments of the Cleaning Tool, there may be a hook surface on one side of the fan tip (2), and a loop surface on the other side of said fan tip (2), thereby making a fan tip (2) with hooks on one side and with loops on the other side. This embodiment may afford the user greater utility in applying the Cleaning Tool invention.

In some other modified embodiments of the Cleaning Tool, there may be a hook surface on one portion of the band channel (6), and the other portion of said band channel (6) would employ a loop surface as the cleaning element. This embodiment may afford the user greater utility in applying the Cleaning Tool invention.

In some modified embodiments, the size and color of the hook and loop fasteners may be modified accordingly. Some embodiments of the Cleaning Tool may employ a larger or smaller size of hooks or loops, for special applications. A light colored hook or loop fastener material may have special utility in cleaning dark matter from equipment, and a dark colored hook and loop fastener material may has special utility in cleaning light matter from equipment.

In some embodiments of the Cleaning Tool invention, there may be grooves tooled into the substantially pinched tubular body (1), or raised areas such as grips or hatching patterns tooled onto the surface of the substantially pinched tubular body (1), to assist the user in holding and using the Cleaning Tool. The preferred embodiment has grips, as shown in FIGS. 1 through 6, inclusive.

In other modifications of the Cleaning Tool invention, there may be a polymeric material, such as rubber, used to cover the substantially, pinched tubular body (1), or the gripping surface, thereby assisting the user in holding and using the Cleaning Tool.

In some modifications of the Cleaning Tool, said Tool may be composed essentially of a metallic material, such as aluminum, or an alloy or the Tool may be composed essentially of a composite material.

Some modifications of the Cleaning Tool may have various size or thickness to the fan tip (2), or the banded quasi-spherical tip (3), to accommodate a desired special application. In the preferred embodiment of the Cleaning Tool, the terminal end of the loop surface (5) is approximately 0.4 inch in length. In the preferred embodiment of the Cleaning Tool, the hook Surface is approximately 0.7 inch in diameter,

DESCRIPTION OF ADDITIONAL EMBODIMENTS OF THE INVENTION

There may be other Embodiments of the Cleaning Tool invention, including variants of the simple embodiment, whereby, e.g., there may be only a single cleaning element. In this embodiment, there may be only a hook surface (7) cleaning element, or alternatively there may be only a loop surface (5) cleaning element. In this sort of embodiment, there may be only a fan tip (2), or alternatively, there may only be a spherical tip, comprising this embodiment of the invention.

Hybrid embodiments of the Cleaning Tool are also possible, and are intended to be included in the present specification. One hybrid embodiment may include the use of other hook-and-loop-like materials, e.g., materials with double hooks, multiple hooks, or hooks and loops imbedded, interwoven, or dispersed within the same cleaning element's surface.

Still other hybrid embodiments of the Cleaning Tool invention have a combination of any of the above disclosed elements or variations thereof.

We claim:

1. A Cleaning Tool, comprised essentially of:
   a) A substantially pinched tubular body;
   b) A fan tip located on one end of said substantially pinched tubular body; and
   c) A fastener surface attached to the surface
   d) A banded quasi-spherical tip located on the end of the substantially pinched tubular, body; opposite the end with the fan tip; and
   e) A fastener surface attached to the surface of said banded quasi-spherical tip.

2. A Cleaning Tool, as recited in claim 1, and further comprised essentially of:
   a) A neck located at the interface between said substantially pinched tubular body and the banded quasi-spherical tip.

3. A Cleaning Tool, comprised essentially of:
   a) A substantially pinched tubular body;
   b) A fan tip located on one end of said substantially pinched tubular body; and
   c) A fastener surface attached to the surface of said fan tip;
   d) A quasi-spherical tip located on the end of the substantially pitched tubular body opposite the end with the fan tip;
   e) A band channel located on the surface of the quasi-spherical tip; and
   f) A fastener surface attached to the surface of the band channel.

4. A Cleaning Tool, as recited in claim 3, and further comprised essentially of:
   a) A neck located at the interface between said substantially pinched tubular body; and said banded quasi-spherical tip.

5. A cleaning Tool, as recited in claim 4, and further comprised essentially of:
   a) a plurality of grips located along the substantially pinched tubular body.

6. A cleaning Tool, as recited in claim 4, and further comprised essentially of:
   a) A parting line extending along the longitudinal length of the substantially pinched tubular body.

7. A cleaning Tool, as recited in claim 6, wherein the fastener surface attached to said banded quasi-spherical tip is comprised essentially of a hook fastener surface.

8. A cleaning Tool, as recited in claim 6, wherein the fastener surface attached to said fan tip is comprised essentially of a loop fastener surface.

* * * * *